United States Patent Office 3,161,498
Patented Dec. 15, 1964

3,161,498
HERBICIDAL THIOCARBIMIDATES, PHOSPHOROTHIOCARBIMIDATES, AND PHOSPHOROTHIOIMIDES
Glenn R. Price, South Chicago Heights, and Edward N. Walsh, Chicago Heights, Ill., and Chester L. Dewald, San Jose, and Stassen Y. C. Soong, Mountain View, Calif., assignors to Stauffer Chemical Company, New York, N.Y., a corporation of Delaware
No Drawing. Filed Aug. 16, 1962, Ser. No. 217,281
15 Claims. (Cl. 71—2.3)

The present invention is directed to a novel group of phosphorothioimides of the general formula:

$$\begin{array}{c} R^1O \\ \phantom{xx} \searrow \phantom{x} \stackrel{O}{\|} \phantom{xx} \stackrel{NR^3}{\nearrow} \\ \phantom{xxxx} P-S-S-C \\ \phantom{xx} \nearrow \phantom{xxxxxxx} \searrow \\ R^2O \phantom{xxxxxxxxx} R^4 \end{array}$$

wherein $R^1$ and $R^2$ are the same or different lower alkyl radicals, $R^3$ is a substituted or unsubstituted phenyl radical, and $R^4$ is selected from the group consisting of lower alkyl radicals and substituted and unsubstituted phenyl radicals, a method of preparing said phosphorothioimides and the use of said phosphorothioimides, as well as certain thiocarbimidates and phosphorothiocarbimidates in the control of pest weeds.

The thiocarbimidate and phosphorothiocarbimidates which are effective herbicides may be characterized by the following formula:

$$\begin{array}{c} \phantom{xxxxxx} NR^5 \\ \phantom{xxxxxxx} \nearrow \\ R-S-S-C \\ \phantom{xxxxxx} \searrow \\ \phantom{xxxxxxx} OR^6 \end{array}$$

wherein R is selected from the group consisting of substituted and unsubstituted lower alkyl radicals, phenyl, carbalkoxyalkyl, and phosphoro ester radicals of the formula:

$$\begin{array}{c} R^7O \phantom{x} O \\ \phantom{xx} \searrow \phantom{x} \stackrel{\|}{P-} \\ \phantom{xx} \nearrow \\ R^8O \end{array}$$

wherein $R^7$ and $R^8$ are lower alkyl radicals; $R^5$ is selected from the group consisting of substituted and unsubstituted lower alkyl radicals and substituted and unsubstituted phenyl radicals; and $R^6$ is selected from the group consisting of substituted and unsubstituted lower alkyl radicals and substituted and unsubstituted phenyl radicals.

Among the suitable lower alkyl radicals for $R^1$, $R^2$, R, $R^7$ and $R^8$, as well as the unsubstituted lower alkyl electives for $R^4$, $R^5$, and $R^6$, are methyl, ethyl, propyl, butyl, octyl, and decyl. Suitable substituted lower alkyl radicals for R, $R^5$ and $R^6$ are the chloro- and bromo-substituted radicals such as trichloromethyl, 2-bromoethyl, monochloromethyl, and the like. The substituted phenyl radicals for $R^3$, $R^4$, $R^5$, and $R^6$ include the halo- and alkoxy-substituted groups such as p-chlorophenyl, o-bromophenyl, o-methoxyphenyl, p-methoxyphenyl, and the like.

Preparation of the novel phosphorothioimides of the invention involves reacting an O,O-dialkylphosphorosulfenyl chloride with a thioamide, preferbaly in the presence of a hydrogen halide acceptor. The reaction may be carried out at temperatures between about —100° C. and +100° C., although about room temperature is to be preferred. Various inert solvents may be used (but not acetone) and the mildly exothermic reactions may be easily controlled. In many instances, it will be desirable to maintain the reaction temeprature below about 50 or 60° C. to prevent decomposition of the products. After filtration and purification, the products are viscous oils, solids or semi-solids, usually the latter two.

The following specific examples illustrate the preparation of the novel compounds of the invention:

EXAMPLE 1

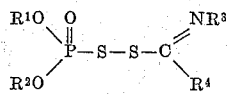

$(C_2H_5O)_2P(O)-S-S-C(=N-\langle\phantom{x}\rangle-OCH_3)(CH_3)$

To a solution of 18.1 grams (0.10 mole) of N-(p-methoxyphenyl) thioacetamide, 150 cc. of ethyl ether, and 15 ml. of triethylamine (0.12 mole) were slowly added 20.4 grams (0.10 mole) of O,O-diethylphosphorosulfenyl chloride. The addition was accomplished over a 40 minute period while the solution temperature was held between 10 and 20° C. After the addition was completed, the solution was stirred for one additional hour at room temperature, filtered, and concentrated to 50° C. at 1.0 mm. of Hg. The filtrate was recovered and determined to be S - (O,O - diethylphosphorothio) - N - (p-methoxyphenyl)thioacetimide. The yield was 35.0 grams (100%) and the analysis was 8.4% P, 16.5% S, and 1.16% Cl compared to 8.9% P, 18.3% S, and 0.0% Cl, theoretical.

EXAMPLE 2

To a solution consisting of 15.1 grams (0.10 mole) of N-(phenyl) thioacetamide, 150 ml. of ethyl ether, 15 ml. (0.12 mole) of triethylamine were added 20.4 grams (0.10 mole) of O,O-diethylphosphorosulfenyl chloride. The addition was accomplished over a 20 minute period while the solution was cooled to a temperature between 10 and 20° C. After the addition was complete, the reaction mixture was stirred for one hour, filtered and stripped to 50° C. at 1.0 mm. of Hg. The product yield was 30.7 grams (97%) of S - (O,O - diethylphosphorothio) - N - (phenyl) thioacetimide, a viscous oil analysing as 9.2% P, 17.6% S, and 0.6% Cl, compared to a theoretically calculated value of 9.7% P, 19.9% S, and 0.0% Cl.

The following specific compounds may be prepared in accordance with the procedures shown in Examples 1 and 2, in the yields indicated. Sample analyses are included in the examples.

EXAMPLE 3

S - (O,O-dimethylphosphorothio)-N-(phenyl)benzthioimide; yield=82.5% of theory; analysis: found=9.2% P, 17.1% S, and 0.8% Cl; theory=8.4% P, 17.3% S, and 0.0% Cl.

EXAMPLE 4

$(CH_3O)_2P(O)-S-S-C(=N-\langle\phantom{x}\rangle-Cl)(C_6H_5)$

S - (O,O-dimethylphosphorothio)-N-(p-chlorophenyl)-thiobenzimide; yield=83% of theory; analysis: found= 7.7% P, 20.3% S, and 7.9% Cl; theory=8.0% P. 16.5% S, and 9.2% Cl.

EXAMPLE 5

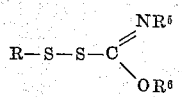

$(C_2H_5O)_2P(O)-S-S-C(=NC_6H_5)\left(-\langle\phantom{x}\rangle^{OCH_3}\right)$ S - (O,O - diethylphosphorothio) - N - (phenyl) - o-methoxyphenyl-thioimide; yield=100% of theory; analysis: found=7.6% P, 14.9% S, and 0.7% Cl; theory=7.6% P, 15.6% S, and 0.0% Cl.

EXAMPLE 6

$(C_2H_5O)_2P(O)-S-S-C(=NC_6H_5)\left(-\langle\phantom{x}\rangle^{Br}\right)$

S - (O,O - diethylphosphorothio) - N - (phenyl) - m-bromobenzene-thioimide; yield=98.5% of theory; analysis: found=6.6% P, 11.9% S, and 18.8% Br; theory=6.75% P, 13.9% S, and 17.4% Br.

EXAMPLE 7

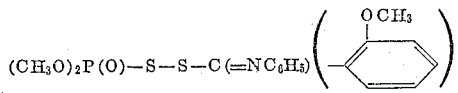

S - (O,O - dimethylphosphorothio) - N - (phenyl)-o - methoxybenzene - thioimide; yield=99.3% of theory; analysis: found=7.4% P, 17.7% S, and 0.3% Cl; theory=7.1% P, 16.7% S, and 0.0% Cl.

EXAMPLE 8

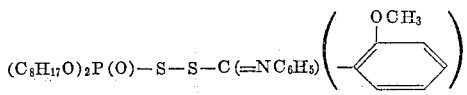

S - (O,O - dioctylphosphorothio) - N - (phenyl) - o-methoxybenzenethioimide; yield=92% of theory.

EXAMPLE 9

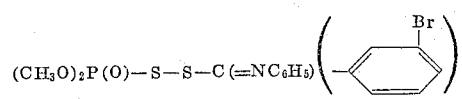

S - (O,O - dimethylphosphorothio) - N - (phenyl)-m-bromophenylthioimide; yield=90% of theory; analysis: found=7.2% P, 13.0% S, and 18.9% Br; theory=7.2% P, 14.8% S, and 18.5% Br.

EXAMPLE 10

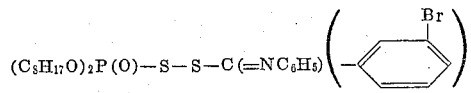

S - (O,O - dioctylphosphorothio) - N - (phenyl) - m-bromophenylthioimide; yield=89.5% of theory; analysis: found=4.9% P, 9.9% S, and 14.4% Br; theory=4.95% P, 10.2% S, and 12.7% Br.

EXAMPLE 11

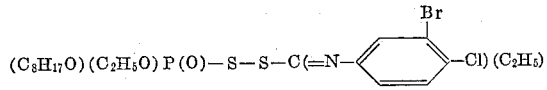

S - (O,O - ethyloctylphosphorothio) - N - (m - bromo-p-chlorophenyl)thioacetimide.

EXAMPLE 12

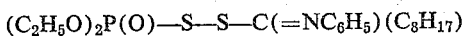

S - (O,O - diethylphosphorothio) - N - (phenyl) - thiononimide.

EXAMPLE 13

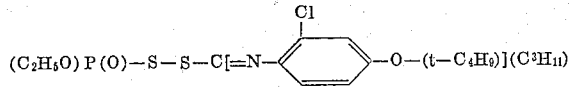

S - (O,O - diethylphosphorothio) - N - (2 - chloro - 4-butoxyphenyl)hexanimide.

The thiocarbimidates of the invention, which have been found to have herbicidal activity, are all known compounds which may be produced by known methods. For a method of preparing the thiocarbimidates, reference is made to Journal of the American Chemical Society, 82, pp. 155–58 (1960). The phosphorothiocarbimidates have been disclosed and claimed in copending U.S. patent application, Serial No. 101,673, filed April 10, 1961, now U.S. Patent No. 3,070,493. A method of preparing the phosphorothiocarbimidates is illustrated in the aforesaid copending application. The following specific example compounds are among the thiocarbimidates and phosphorothiocarbimidates which have been found to have a high level of herbicidal activity.

| Example No. | Compound |
|---|---|
| 14 | S - (trichloromethylthio) - O - (methyl) - N - (phenyl)thiocarbimidate. |
| 15 | S - (carbethoxymethylthio) - O - (methyl) - N - (phenyl) - thiocarbimidate. |
| 16 | S-(butylthio)-O-(isopropyl)-N-(phenyl)thiocarbimidate. |
| 17 | S-(phenylthio)-O-(isopropyl)-N-(isopropyl)thiocarbimidate. |
| 18 | S-(phenylthio)-O-(ethyl)-N-(phenyl)thiocarbimidate. |
| 19 | S-(ethylthio)-O-(isopropyl)-N-(isopropyl)thiocarbimidate. |
| 20 | S-[O-(ethyl)-O-(octyl)-phosphorothio]-O-(isopropyl)-N-(phenyl)thiocarbimidate. |
| 21 | S-(O,O-diethylphosphorothio)-O-(isopropyl)-N-(phenyl)thiocarbimidate. |
| 22 | S-(O,O-dimethylphosphorothio)-O-(isopropyl)-N-(phenyl)thiocarbimidate. |
| 23 | S-(O,O-dipropylphosphorothio)-O-(isopropyl)-N-(phenyl)thiocarbimidate. |
| 24 | S-(O,O-diethylphosphorothio)-O-(ethyl)-N-(p-chlorophenyl)thiocarbimidate. |
| 25 | S-(O,O-diethylphosphorodithio)-O-(ethyl)-N-(phenyl)thioformimidate. |
| 26 | S-(O,O-diethylphosphorodithio)-O-(ethyl)-N-(phenyl)thiocarbimidate. |
| 27 | S-(O,O-dimethylphosphorodithio)-O-(ethyl)-N-(phenyl)thiocarbimidate. |
| 28 | S-(O,O-dimethylphosphorothio)-O-(ethyl)-N-(phenyl)thioformimidate. |
| 29 | S-(O,O-dioctylphosphorothio)-O-(methyl)-N-(phenyl)thiocarbimidate. |
| 30 | S-(O,O-diethylphosphorothio)-O-(methyl)-N-(phenyl)thiocarbimidate. |
| 31 | S-(O,O-dimethylphosphorothio)-O-(methyl)-N-(phenyl)thiocarbimidate. |
| 32 | S-(carbethoxymethylthio)-O-(ethyl)-N-(phenyl)thiocarbimidate. |

The compounds of the present invention were tested for herbicidal activity on some economically important plant species. Unusually high herbicidal activity against wild oats has been observed with most of the compounds of the foregoing examples, especially where the compound is added as a pre-emergent spray to the soil. The following table illustrates typical pre-emergence herbicidal activity of the thiocarbimidates, phosphorothiocarbimidates, and phosphorothioimides on wild oats. The data obtained from plant physiological tests are reported hereinafter as "+" for slight injury, "++" for moderate injury, and "+++" for severe injury to plant life. To more specifically define the type of injury observed, the superscripts "T.D." (tip dead), "B." (burn), "De." (desiccation), "M." (leaf malformation), "Ge." (germination), and "Ca." (chlorosis), are shown when applicable, where severe plant injury or death occurred.

Table I
PRE-EMERGENCE HERBICIDAL ACTIVITY OF THIOCARBIMIDATES, PHOSPHOROTHIOCARBIMIDATES AND PHOSPHOROTHIOIMIDES ON WILD OATS

| Compound (Example No.) | Herbicidal Activity—Wild Oats |
|---|---|
| 5 | + |
| 6 | + |
| 7 | +++ M. |
| 14 | +++ M., B. |
| 15 | +++ |
| 16 | +++ M. |
| 18 | +++ |
| 20 | +++ |
| 21 | +++ |
| 22 | +++ |
| 23 | +++ M. |
| 24 | + |
| 25 | +++ |
| 26 | +++ B. |
| 27 | +++ |
| 28 | +++ Ge. |
| 29 | + |
| 30 | +++ M. |
| 31 | +++ De. |

In addition to the foregoing activity with wild oats, the compounds have been tested for both pre-emergence and post-emergence herbicidal activity on a broad group of common weed pests. The results of such tests are reported in Table II, wherein the following reference characters have been used to represent the indicated plant species:

C=crab grass
D=dock
F=foxtail
G=pigweed
M=mustard
P=pinto bean
W=watergrass $R^4$ is selected from the class consisting of lower alkyl, phenyl and substituted phenyl, the substituents for the phenyl radicals being selected from the group consisting of halo- and alkoxy-.

2. S - (O,O - diethylphosphorothio) - N - (p-methoxyphenyl)thioacetimide.
3. S - (O,O-dimethylphosphorothio) - N - (phenyl)-benzthioimide.
4. S - (O,O - dimethylphosphorothio) - N - (p - chlorophenyl)thiobenzimide.

*Table II*

HERBICIDAL ACTIVITY OF THIOCARBIMIDATES, PHOSPHOROTHIOCARBIMIDATES, AND PHOSPHOROTHIOIMIDES ON SELECTED WEED SPECIES

| Compound (Example No.) | Mode of Application | C | D | F | G | M | P | W |
|---|---|---|---|---|---|---|---|---|
| 1 | Pre-emergence | + | | ++ | + | | +++T.D. | + |
| 2 | do | + | | ++ | + | | +++T.D. | |
| 3 | do | | | | + | | | |
| 4 | do | | | | ++ | | + | + |
| 5 | do | +++M. | ++ | | + | | | |
| 5 | Post-emergence | +++De. | | | | +++De. | +++De. | ++ |
| 6 | Pre-emergence | + | | | | ++ | | + |
| 7 | do | +++Ch. | +++B. | | ++ | ++ | +++De. | ++ |
| 7 | Post-emergence | ++ | | | | +++De. | +++De. | ++ |
| 8 | Pre-emergence | +++Ch. | +++B. | | | ++ | +++D. | ++ |
| 8 | Post-emergence | ++ | | | | +++De. | | ++ |
| 9 | Pre-emergence | ++ | + | | ++ | | | + |
| 10 | do | + | | | | | | + |
| 15 | do | ++ | +++Ge. | | +++Ge. | +++B. | | ++ |
| 17 | Post-emergence | ++ | + | | | | +++T.D. | + |
| 18 | Pre-emergence | ++ | +++Ge. | | +++Ge. | ++ | +++De. | +M. |
| 18 | Post-emergence | +++Ge. | +++De. | | | | | +De. |
| 20 | Pre-emergence | | | +++M. | ++ | + | + | +M. |
| 21 | do | | +++Ge. | +++M. | | +++Ge. | | +++M. |
| 22 | do | + | +++Ge. | +++De. | | +++Ge. | + | +++M. |
| 23 | do | ++ | +++B. | ++ | ++ | + | | +++M. |
| 24 | do | ++ | | + | | | | |
| 26 | do | + | ++ | ++ | ++ | | | + |
| 28 | do | | | | | +++Ge. | | |
| 29 | do | | | ++ | ++ | | | |
| 30 | do | | +++M. | +M. | | +++Ge. | | +++M. |
| 31 | do | | ++ | +M. | | +++Ge. | | +++M. |

Pre-emergence herbicidal tests were conducted following planting, but prior to emergence of the plants usually the day following planting. The active compounds were applied at a cconcentration of twenty pounds of active material, diluted in water to a volume of eighty gallons, for each planted acre treated. The aqueous herbicidal solution or dispersion was simply sprayed on the pre-planted soil from a hand sprayer. After fourteen days, plants were inspected and compared with an untreated control group planted on the same day. Post-emergence herbicidal tests were initiated approximately two weeks following emergence of the test plants. The method of application involved spraying on the plant foliage a 0.2% aqueous solution or dispersion of the active compound to the point of run-off. The concentration of active material when spraying this solution was approximately twenty-five pounds per planted acre. Evaluation of herbicidal activity was made after fourteen to nineteen days. Although the above tests were accomplished with aqueous dispersions or solutions, the toxic compounds may also be used in the form of wettable powders, vapors, and dusts, as may be best suited to the conditions of use. For more specialized application, the toxic material may even be used in its pure undiluted form.

Further, the compounds have shown defoliating activity on occasion with cotton and corn, and nominal activity against bind weed, Jimson weed, and oats.

The foregoing description is given for clearness of understanding only, and no unnecessary limitations should be understood therefrom, as modifications will be obvious to those skilled in the art.

We claim:

1. A compound of the formula

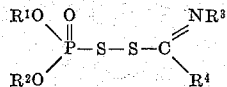

wherein $R^1$ and $R^2$ are lower alkyl, $R^3$ is selected from the class consisting of phenyl and substituted phenyl, and $R^4$ is selected from the class consisting of lower alkyl, phenyl and substituted phenyl, the substituents for the phenyl radicals being selected from the group consisting of halo- and alkoxy-.

5. S - (O,O - diethylphosphorothio) - N - (phenyl) - o-methoxyphenylthioimide.

6. A method of controlling plant life which comprises contacting said plant life with an herbicidal amount of at least one compound of the formula

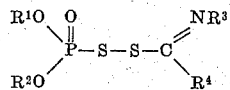

wherein $R^1$ and $R^2$ are lower alkyl, $R^3$ is selected from the class consisting of phenyl and substituted phenyl, and $R^4$ is selected from the class consisting of lower alkyl, phenyl and substituted phenyl, the substituents for the phenyl radicals being selected from the group consisting of halo- and alkoxy-.

7. A method of controlling plant life which comprises contacting said plant life with an herbicidal amount of S - (O,O - diethylphosphorothio) - N - (p - methoxyphenyl)thioacetimide.

8. A method of controlling plant life which comprises contacting said plant life with an herbicidal amount of S - (O,O - dimethylphosphorothio) - N - (phenyl) - o-methoxybenzenethioimide.

9. A method of controlling plant life which comprises contacting said plant life with an herbicidal amount of S - (O,O - diocytylphosphorothio) - N - (phenyl) - o-methoxybenzenethioimide.

10. A method of controlling plant life which comprises contacting said plant life with an herbicidal amount of S - (O,O - dioctylphosphorothio) - N - (phenyl) - m-bromophenylthioimide.

11. A method of controlling plant life which comprises contacting said plant life with an herbicidal amount of at least one compound of the general formula

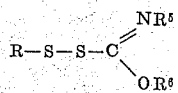

wherein R is selected from the class consisting of substituted and unsubstituted lower alkyl, phenyl, carbalkoxyalkyl, and the group of the formula

wherein $R^7$ and $R^8$ are lower alkyl; and $R^5$ and $R^6$ are selected from the class consisting of substituted and unsubstituted lower alkyl and substituted and unsubstituted phenyl, the substituents for the lower alkyl radicals of R, $R^5$, and $R^6$ being selected from the group consisting of chloro- and bromo- and those for the phenyl radicals of $R^5$ and $R^6$ being selected from the group consisting of halo- and alkoxy-.

12. A method of controlling plant life which comprises contacting said plant life with an herbicidal amount of S - (carbethoxymethylthio) - O - (methyl) - N - (phenyl)-thiocarbamidate.

13. A method of controlling plant life which comprises contacting said plant life with an herbicidal amount of S-(phenylthio)-O-(ethyl)-N-(phenyl)thiocarbimidate.

14. A method of controlling plant life which comprises contacting said plant life with an herbicidal amount of O-(isopropyl)-N-(phenyl)thiocarbimidate.

15. A method of controlling plant life which comprises contacting said plant life with an herbicidal amount of S - (O,O - dimethylphosphorothio) - O - (isopropyl) - N-(phenyl)thiocarbimidate.

References Cited in the file of this patent
UNITED STATES PATENTS

| | | |
|---|---|---|
| 2,891,059 | Malz et al. | June 16, 1959 |
| 2,965,535 | Birum | Dec. 20, 1960 |
| 3,018,215 | Pianka | Jan. 23, 1962 |
| 3,044,981 | Malz et al. | July 17, 1962 |
| 3,053,876 | Malz et al. | Sept. 11, 1962 |
| 3,070,493 | Price et al. | Dec. 25, 1962 |